United States Patent
Abma et al.

(10) Patent No.: US 9,678,233 B2
(45) Date of Patent: Jun. 13, 2017

(54) SEISMIC SOURCE CODING, ACTIVATION, AND ACQUISITION

(71) Applicants: Raymond Lee Abma, Houston, TX (US); Allan Ross, Houston, TX (US)

(72) Inventors: Raymond Lee Abma, Houston, TX (US); Allan Ross, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 211 days.

(21) Appl. No.: 14/540,506

(22) Filed: Nov. 13, 2014

(65) Prior Publication Data

US 2015/0131409 A1 May 14, 2015

Related U.S. Application Data

(60) Provisional application No. 61/903,587, filed on Nov. 13, 2013.

(51) Int. Cl.
*G01V 1/38* (2006.01)
*G01V 1/00* (2006.01)

(52) U.S. Cl.
CPC ............ *G01V 1/3808* (2013.01); *G01V 1/003* (2013.01); *G01V 2210/127* (2013.01)

(58) Field of Classification Search
CPC . G01V 1/003; G01V 1/3808; G01V 2210/127

USPC ..................... 367/7, 25, 23, 15, 21
See application file for complete search history.

(56) References Cited

U.S. PATENT DOCUMENTS

| 2008/0019215 A1* | 1/2008 | Robertsson | G01V 1/3808 367/19 |
| 2012/0014213 A1* | 1/2012 | Eick | G01V 1/3808 367/23 |
| 2012/0147701 A1* | 6/2012 | Ross | G01V 1/005 367/23 |

OTHER PUBLICATIONS

"Simulated annealing," Wikipedia, Nov. 10, 2012, downloaded Nov. 14, 2016 from https://en.wikipedia.org/w/index.php?title=Simulated_annealing&oldid=522300806, 9 pp.*

* cited by examiner

*Primary Examiner* — Daniel L Murphy
(74) *Attorney, Agent, or Firm* — KaRan Reed

(57) ABSTRACT

The Monte-Carlo method of generating Popcorn shooting patterns starts with the number and sizes of the guns available and the length in time of the desired Popcorn pattern. The firing times and order of the guns will be randomly perturbed and a large number of Popcorn patterns built. Candidate Popcorn patterns will then be tested against a set of criteria to identify acceptable or the best patterns. These criteria may include limits on maximum peak strength, distinctiveness compared to the other patterns, and the size of the notches and peaks in the spectra.

19 Claims, 6 Drawing Sheets

SEISMIC SOURCE CODING, ACTIVATION, AND ACQUISITION

CROSS-REFERENCE TO RELATED APPLICATIONS

This application claims priority, under 35 U.S.C. §119(e), of Provisional Application No. 61/903,587, filed Nov. 13, 2013, incorporated herein by this reference.

STATEMENT REGARDING FEDERALLY SPONSORED RESEARCH OR DEVELOPMENT

Not applicable.

BACKGROUND

This disclosure relates generally to the seismic surveillance and, in particular, to methods for acquiring seismic and other signals that are representative of the subsurface for purposes of seismic exploration and/or surveillance.

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth. "Echoes" of that signal are then recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common. Typical trace lengths are 5-16 seconds, which corresponds to 2500-8000 samples at a 2-millisecond interval. Conventionally each trace records one seismic source activation, so there is one trace for each live source location-receiver activation. In a typical 2-D survey, there will usually be several tens of thousands of traces, whereas in a 3-D survey the number of individual traces may run into the multiple millions of traces.

In seismic acquisition a marine source array, often an array of air guns, is composed of many single units that are towed behind a vessel that travels over the survey area. These units (e.g., air guns, water guns, sparkers, boomers, chip systems, water sirens, etc.) are typically hung in a line under a sausage buoy to allow them to be towed in a streamlined fashion. It is typical in deep water seismic surveying to use 6 to 15 guns under a single buoy. This configuration of seismic sources is conventionally referred to as a sub-array. A conventional seismic source array is comprised of one or more sub-arrays, all of which are all conventionally activated simultaneously and thereafter treated as thought it were a single source.

Of recent interest is the use of so-called "Popcorn" survey techniques (as described more fully hereinafter) in marine seismic surveys. However, for all of the promise these sorts of surveys might hold, designing such surveys involves considerations that are different from those typically encountered in a conventional seismic survey.

It should be noted and remembered that the description which follows, together with the accompanying drawings, should not be construed as limiting the claims to the examples (or embodiments) shown and described. This is so because those skilled in the art to which the disclosure pertains will be able to devise other forms of this disclosure within the ambit of the appended claims.

BRIEF SUMMARY OF THE DISCLOSURE

According to one aspect, there is provided a system and method of marine seismic exploration that allows towed seismic sources to be used more efficiently than has been possible heretofore.

As an example, the airgun depth could be made to be one of the parameters that is considered when a pattern for the airgun is designed. That is, it is known that varying the depth of a marine seismic source will alter the location of a ghost notch in frequency spectrum of the recorded source. Thus, a depth of the source(s) could be chosen so as to minimize the resulting surface ghost notches. Since a source of notches in the Popcorn patterns is the repetition of airgun impulses over time, if there are two airguns, a notch will be created that generally corresponds to the time separation between the impulses. On the other hand, using more airguns may reduce that notch, but may produce others. Thus, in some embodiments the resulting spectra will be examined to determine the extent to which a notch is present. Another issue of the spectra is that it is fairly easy to attenuate the low frequencies, so in some embodiments the low frequencies of each pattern will be examined to eliminate those for which these frequencies are unduly attenuated.

A method of seismic exploration for hydrocarbons within a region of the subsurface of the earth, wherein is provided a set of seismic sources, said set of seismic sources comprising a plurality of subarrays, each of said subarrays having one or more seismic sources associated therewith, the method comprising; determining a firing time duration; randomly assigning each of said plurality of subarrays a different firing time within said firing time duration, thereby forming a firing schedule; positioning said set of seismic sources at a first location proximate to the region of the subsurface of the earth; activating each of said subarrays according to said firing schedule; recording seismic data as each of said plurality of subarrays is activated; performing the steps of "positioning", "activating", and "recording" at a plurality of different locations proximate to the region of the subsurface of the earth, thereby acquiring a Popcorn seismic survey; reconstructing said recorded seismic data from said Popcorn seismic survey, thereby obtaining a plurality of seismic traces; and, using said plurality of seismic traces A method of seismic exploration for hydrocarbons within a region of the subsurface of the earth, the method comprising: accessing a plurality of seismic traces within a seismic survey collected proximate to the region of the subsurface of the earth according to an acquisition method comprising: selecting a set of seismic sources, said set of seismic sources comprising a plurality of subarrays, each of said subarrays comprising one or more of said set of seismic sources, determining a firing time duration, randomly assigning each of said plurality of subarrays a different firing time within said firing time duration, positioning said set of seismic source at a first location proximate to the region of the subsurface of the earth, activating each of said seismic subarrays according to its assigned firing time within said firing time duration, recording seismic data as each of said plurality of seismic subarrays is activated, and, performing at least the steps of "positioning", "activating", and "recording" a plurality of times at a plurality of different locations proximate to the region of the subsurface of the earth, reconstructing said recorded seismic data to obtain said plurality of seismic traces; and, using said plurality of seismic traces to image at least a portion of the subsurface of the earth, thereby exploring for hydrocarbons within the region of the subsurface of the earth.

A method of seismic exploration above a region of the subsurface of the earth containing structural or stratigraphic features conducive to the presence, migration, or accumulation of hydrocarbons, wherein is provided a marine seismic array towed proximate to the region of the subsurface of the earth, said marine array comprising a plurality of subarrays, each of said subarrays having one or more marine seismic sources associated therewith, of the method comprising: providing a different randomly generated schedule of pattern use and timing for each of said plurality of subarrays; recording seismic data as each of said plurality of subarrays is activated according to said provided schedule of pattern use and timing; reconstructing said continuously recorded seismic data into a plurality of seismic traces; and, using said plurality of seismic traces to image at least a portion of the subsurface of the earth.

The foregoing has outlined in broad terms the more important features of the system and method disclosed herein so that the detailed description that follows may be more clearly understood, and so that the contribution of the instant inventors to the art may be better appreciated. The instant disclosure is not to be limited in its application to the details of the construction and to the arrangements of the components set forth in the following description or illustrated in the drawings. Rather, it is capable of other embodiments and of being practiced and carried out in various other ways not specifically enumerated herein. Finally, it should be understood that the phraseology and terminology employed herein are for the purpose of description and should not be regarded as limiting, unless the specification specifically so limits it.

BRIEF DESCRIPTION OF THE DRAWINGS

Other objects and advantages of embodiments will become apparent upon reading the following detailed description and upon reference to the drawings in which.

DETAILED DESCRIPTION OF THE PREFERRED EMBODIMENTS

Figure 1:
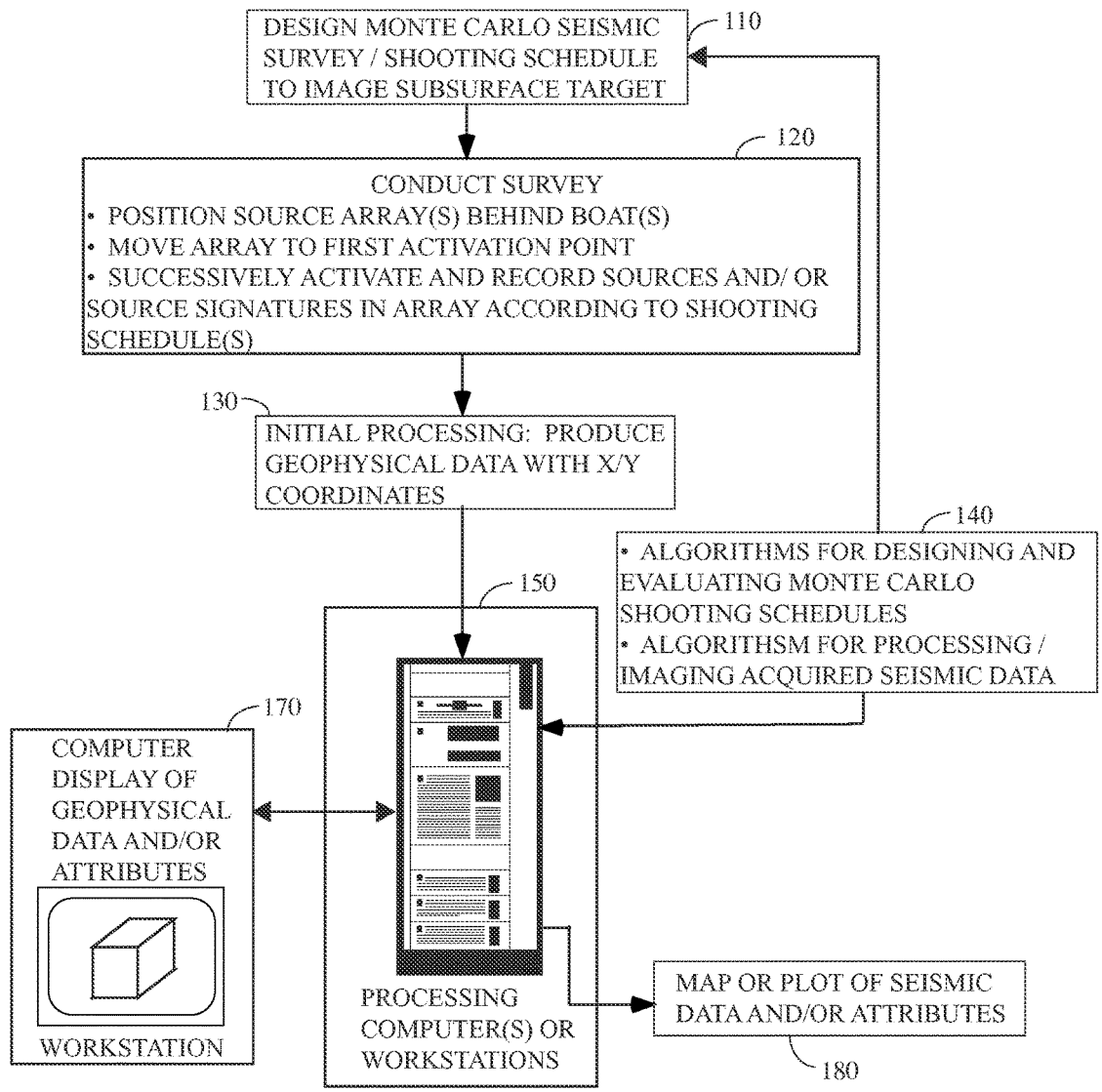
FIG. 1 illustrates a general processing environment.

While this disclosure is susceptible of embodiment in many different forms, there is shown in the drawings, and will herein be described hereinafter in detail, some specific embodiments. It should be understood, however, that the present disclosure is to be considered an exemplification of the principles thereof and is not intended to limit the disclosure to the specific embodiments or algorithms so described.

According to an embodiment, there is provided a method of marine seismic acquisition that reduces the peak amplitude of the source signal, is compatible with simultaneous source acquisition, and can reduce interference between proximate surveys. It should be noted that additional descriptions of some aspects of the Popcorn survey method may be obtained by reference to U.S. patent application Ser. No. 13/315,947, US 2012/0147701 A2 (i.e., the "Popcorn" patent application) the disclosure of which is incorporated by reference herein as if fully set out at this point.

For purposes of the instant disclosure, in the marine context the term "set of seismic sources" will be a collection of seismic sources that are positioned to be proximate to each other and intended to be activated as part of the same Popcorn seismic shot. In a marine context, this might be a single seismic array of sources or multiple source arrays towed by one or more boats. On land, this term might be used to describe some number of land vibrators (e.g., 10 or so), Mini-Soise™ surveys, weight drop surveys, etc. A subarray (which might consist of one or more sources) will be understood to be a subset of the sources in a towed array, with the source(s) assigned to each subarray being intended to be activated simultaneously. As described herein, references to arrays may also apply to subarrays except where context excludes such a possibility.

Self-simultaneous sourcing in the marine context, for example, is a method of increasing the shot spatial sampling density of a seismic survey without slowing down the speed of the shooting boat. A typical self-simultaneous shooting example might activate the source arrays at half the time interval of that used in a conventional survey. This causes the shot records to overlap each other in time which is generally avoided in seismic acquisition. Thus, for purposes of the instant disclosure, "self-simultaneous source" acquisition will be understood to be a method of seismic data collection where the signals from two or more successive source (array) activations from the same source or nearby sources materially interfere with each other, where a source or array of sources is "nearby" when sources are towed by the same vessel. Fortunately, though, overlapping shots can then separated during processing according to methods well known to those of ordinary skill in the art (e.g., shot separation by inversion). Some variations of the Popcorn acquisition system and method taught herein may involve self-simultaneous sourcing but that is not a requirement. "Self-simultaneous sourcing" should be understood to refer to instances where the same source (including an array of individual sources) is activated in rapid enough succession that late arriving reflections from a first activation of that source overlap in time and materially interfere with early arriving reflections from one or more subsequent activations of that same or nearby source. An embodiment of self-simultaneous sourcing is illustrated and described below with reference to FIG. 9.

Popcorn shooting is the practice of sequentially activating the sources in a set over a period of time instead of the conventional practice of simultaneously firing of all the guns in the set. Broadly speaking there are three variations of this approach. The first is Popcorn shooting where a source does not overlap itself. A second variation of Popcorn shooting is self-simultaneous Popcorn in which one or more sources overlap themselves. Finally, in still another variation of Popcorn shooting, the instant system and method may be implemented where one source vessel (or, more generally, more than one survey crew) shoots against another.

The reconstruction of the signals from Popcorn acquisition depends to a large extent on the air gun patterns used to acquire them. Poorly designed patterns can reduce the accuracy of the reconstructions, while well-designed patterns improve it. As such, according to an embodiment, a Monte-Carlo method is used for pattern design where many random shooting patterns are computer generated and then checked against a set of criteria to determine which of the random patterns are acceptable or, in some embodiments, the best.

An embodiment of the instant Monte-Carlo method of generating patterns will start with the number and sizes of the guns available and the length in time of the desired Popcorn pattern. The firing times and order of the guns will be randomly perturbed and a large number of Popcorn patterns built. The simulations generated from the selected Popcorn patterns may then be tested against a set of criteria that might include limits on maximum peak strength, distinctiveness compared to the other patterns, the size of the notches and peaks in the spectra, low frequency response, etc.

In an embodiment, the Monte-Carlo patterns will be examined after they are generated to reduce or avoid large peaks or common notches in the spectra of the results, as well as reducing or avoiding randomly generated patterns that look too similar to each other.

Turning now to FIG. 1, this figure contains a general overview of an embodiment and its associated environment. As is indicated, generally speaking a marine seismic survey will be designed 100 and evaluated according to the methods, and using the algorithms (block 140), taught herein including, more specifically, Monte Carlo design of the shooting patterns. That means, as a specific example, an array (or some number of sub-arrays) will be selected together with two or more seismic sources that are to be towed behind the source boat. Those of ordinary skill in the art will understand how such is done and especially how such is done where the object is to image a particular subsurface target.

In the field, seismic data will be collected according to the instant disclosure (block 120). As is taught herein, individual sources within the array (or the multiple sources that comprise a subarray) will be activated and recorded according to the specified schedule that determines when a pattern will be used and the timing, coordination and/or location of the use of such pattern ("schedule of pattern use and timing") pursuant to the survey design 110 while the vessel is in motion.

Additionally, in some embodiments a field-signature might be recorded for each source. It is anticipated that according to an embodiment the vast majority of source activations will overlap (or be overlapped by) one or more other activations including, optionally, instances where a source might overlap itself (e.g., self simultaneous shooting). In some instances, the receivers will be sensors that are towed behind the source or another vessel. In other cases, the receivers might include ocean bottom receivers instead of (or in addition to) the towed geophone streamers.

Next, and as is conventionally done, some initial processing will be performed to associate each seismic recording with a surface or other location (block 130). This might be done in the field or in the processing center. In either case, a computer system 150, which might be a workstation, a server, a main frame, a parallel computer, a networked collection of computers or workstations, etc.

Next, the individual source or subarray activations will be identified and the processed to create a coded signal. According to an embodiment and is described more fully below, the source signatures from each of the sources will be used to reconstruct the recorded data into traces that are comparable to conventionally generated traces. In the event that self simultaneous shooting is employed, it may additionally be necessary to separate the shots according to methods well known to those of ordinary skill in the art (e.g., via sparse inversion). Algorithms that do deconvolution and separation (if needed) will typically be made available to a computer that is to utilize them via access to some amount of local or remote hard disk or other storage (item 140). Additional algorithms useful in the processing of seismic data will be similarly provided to the CPU 150 which might be any conventional or unconventional programmable computing device.

Following identification and, if necessary, separation of the different seismic source recordings, the data will be processed as has been generally discussed above depending on the survey design. In some instances the source activations might be combined in different ways to produce the same effect as a simultaneous excitation of the entire array or source set, combined in such a way as to focus the array to emphasize reflectivity from a particular target (e.g., via beam steering), or, combined to minimize the effect of the ghost notch, etc. The resulting data records will be seismic records that are comparable to those conventionally recorded by other methods.

The resulting seismic data might be used in any number of ways. Conventionally, the data will be processed and viewed on a computer display such as that of a workstation 170. Output from the seismic processing may be used to create maps or plots of seismic data and/or seismic attributes 180 according to methods well known to those of ordinary skill in the art.

Figure 2:
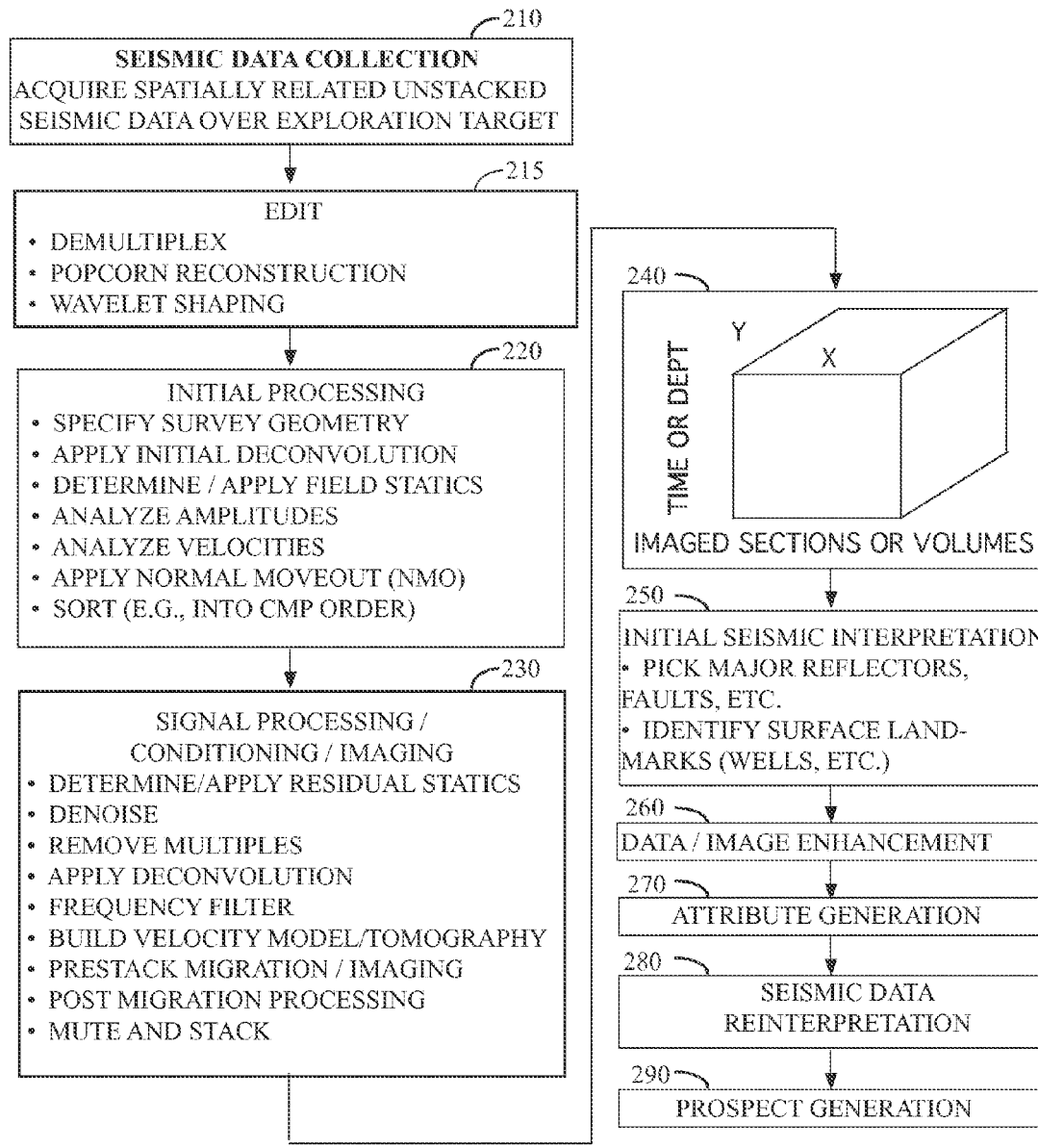
FIG. 2 contains an operating logic suitable for use with an embodiment.

FIG. 2 contains additional details of a typical seismic processing sequence that might begin with data collection according to the design considerations of the instant disclosure 210, editing 215, some sort of initial processing 220, conditioning of the signal and imaging 230, production of imaged sections or volumes 240, initial interpretation of the seismic data 250, further image enhancement consistent with the exploration objectives 260, generation of attributes from the processed seismic data 270, reinterpretation of the seismic data as needed 280, and ultimately generation of a drilling prospect 290. In an embodiment, one aspect of the Popcorn method could be implemented as part of block 215. Note that if an embodiment of the methods taught herein were implemented using land or marine vibrators, the vibrator correlation might be handled as part of this block and, in some cases, as part of the Popcorn reconstruction.

Figure 5:
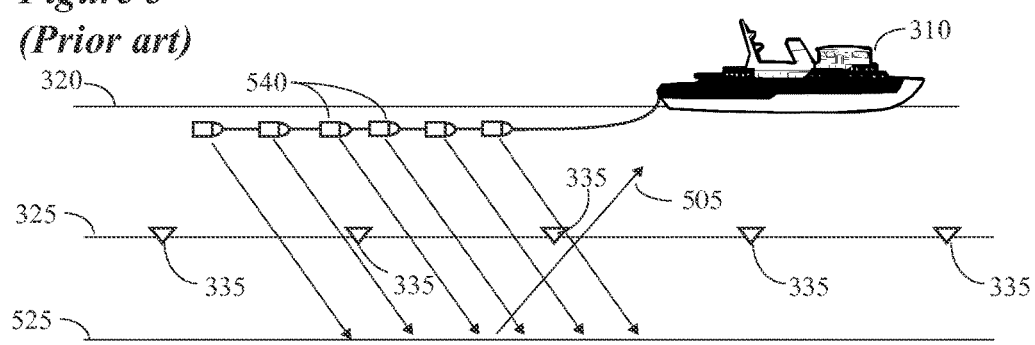
FIG. 5 illustrates a prior art approach to source activations using an array of marine seismic sources.

Turning to FIG. 5, this figure illustrates a conventional approach to using a source array in a marine setting. In this example, each of the sources 540 in the array will be activated simultaneously which will result in a single recorded activation (represented schematically by the up going ray 505).

Because all of the sources 540 are activated simultaneously the six reflecting points associated with the six source activations will be smeared and treated as if the acoustic energy had been emitted from the geometric center of the array (i.e., somewhere between the third and four source which is schematically represented by the origin of the up going ray 505). This smearing, of course, introduces certain inaccuracies into the subsurface image that is formed from seismic traces that have been collected by a conventional method.

Figure 6:
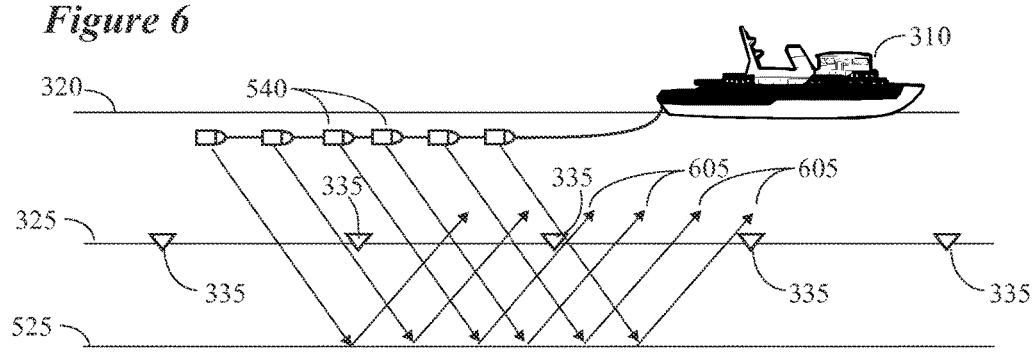
FIG. 6 illustrates an advantage of an embodiment.

By way of comparison, if the six guns 540 were to be fired individually (FIG. 6) or as separate subarrays, each subarray will potentially be subject to less smearing and, in the event that individual shots are recorded, smearing of the sort discussed previously will be eliminated. That is, if individual source activations are recorded, they can be reconstituted as a single shot comparable to the arrangement of FIG. 5 if that is desired, or they could be reconstituted as six separate shots, thereby increasing the spatial sampling by a factor of six. In FIG. 6, each of the guns 540 will generate its own up going wave field 605 which could, possibly depending length of time over which the subarrays are activated, be extracted, separately processed and combined (or not) with other source activations from this array.

Self-simultaneous sourcing, which is an embodiment, is a method of increasing the shot spatial sampling density of a seismic survey without slowing down the speed of the shooting boat. A typical self-simultaneous shooting example would be shooting at half the time interval of a conventional survey, where each shot is comprised of some number of sources fired simultaneously. This will cause the shot records to overlap each other in time which is generally avoided in seismic acquisition. However, overlapping shots can then separated during subsequent processing according to methods well known to those of ordinary skill in the art (e.g., by using inversion or, more specifically, in some embodiments by sparse inversion).

Popcorn shooting is the practice of separately activating subarrays (e.g., shooting individual air guns) within a set of sources over a relatively short period of time instead of the conventional approach of simultaneously firing of all of the guns in the set. One application of Popcorn shooting in the marine context is continuous Popcorn, that is, the continuous firing of air guns while the boat is moving. Processing continuous Popcorn in some embodiments involves choosing a shot point interval, collecting all the air gun firings within each of those intervals, and separating the resulting overlapping shots with a combination of Popcorn reconstruction and shot separation by inversion as described in the first shot separation by inversion patent application US 2010/0299070, the disclosure of which is incorporated herein by reference as if fully set out at this point. In some instances, there may be a time overlap of in successive activations of the same source (i.e., self-simultaneous shooting) in which case it will be necessary to separate those shots according to methods well known to those of ordinary skill in the art.

In an embodiment one goal will be to shape Popcorn-acquired seismic data to match or otherwise resemble the data that would have been created using a conventional airgun or airgun array with a known signature. Of course, given a known or estimated signature, the resulting seismic data can be further shaped to approximate a spike-like source according to methods well known to those or ordinary skill in the art (e.g., via deconvolution).

According to an embodiment, one method of designing Popcorn patterns would be to use Monte-Carlo methods. However, since completely random choice of the parameters of a Popcorn pattern could result in designs that are nonoptimal or nonsensical, the randomly chosen patterns will typically need to be evaluated against some criterion or criteria. In one embodiment, the accuracy of the reconstruction of the subsurface will be used as a criterion. However, although in theory this would be an ideal criterion, in many situations of practical importance the computational effort that would be required to calculate the accuracy of subsurface seismic image would be substantial. However, to the extent such a computation is economically feasible that approach would be a good one. Indeed, since in some embodiments a suitable schedule (or collection of schedules) will be useable for multiple surveys to image the same or a similar target, such an arrangement might make more feasible the computational effort associated with selecting one or more survey schedules.

Other criteria might be used instead of accuracy and, in some cases, these criteria would likely be less computationally expensive to compute and, thus, more practical. For example, criteria such as maximum peak signal strength, distinctiveness compared to the other patterns, and the size of the notches and peaks in the resulting spectra, could be used, although these are not necessarily the only or the most important ones. Other criteria could include parameters such as gun refill time requirements, air supply limits, reuse of guns within a Popcorn pattern, the availability of spare guns, the use of the air guns either to disrupt the water surface to attenuate the ghost notch or to suppress the bubble oscillations of the bubbles still in the water, etc.

Another criterion that might be included is the reduction of the surface source ghost by timing successive shots to be at or near the (x,y) position that previous shots have occupied. Those previous shots' bubbles will have expanded as they rise. The upward traveling P wave from successive shots will interact with those bubbles and be reflected at arbitrary angles and/or be reflected from a surface disturbed by a breaking bubble. In that case, the upward traveling P-wave from the source would reflect with a reduced surface ghost with the benefits of a simpler source signature, reduced notches in the source spectrum, reduced acoustic energy in the ocean. To achieve a reduced source ghost, certain conditions must be met, such as gun depths, bubble rise times, gun separations, array length, vessel speed, pattern lengths, etc., any of which could be made parameters in the Monte Carlo generation of Popcorn shooting patterns.

Particularly careful selection of the design of patterns may be needed for continuous Popcorn shooting, and this is especially so if the shooting is to be self-simultaneous. Continuous Popcorn allows the shot spacing to be a processing parameter, but continuous Popcorn also may involve a significant element of simultaneous shooting. To ensure that the shots defined by the processing for a given shot spacing can be well separated, the Popcorn patterns will typically be designed to work well with several possible shot spacings. While the patterns for each shot spacing are unlikely to be orthogonal, the patterns should avoid strong correlations between the effective patterns used with the various shot spacings that may be attempted during the processing of the data.

According to still other embodiments, simulated annealing, genetic algorithms, hybrid genetic algorithms, neural networks, expert systems and other artificial intelligence methods, and minimum entropy methods might be used to calculate suitable survey patterns. In brief, the problem of designing patterns is basically an optimization problem with a set of constraints and a set of goals. There will be some trade-offs between the different goals and the different constraints depending on the importance of the constraints and goals for any particular seismic survey.

Numerical experiments/simulations have shown that the instant approach can yield very good reconstructions, much better than may be needed in a practical sense.

Figure 3:
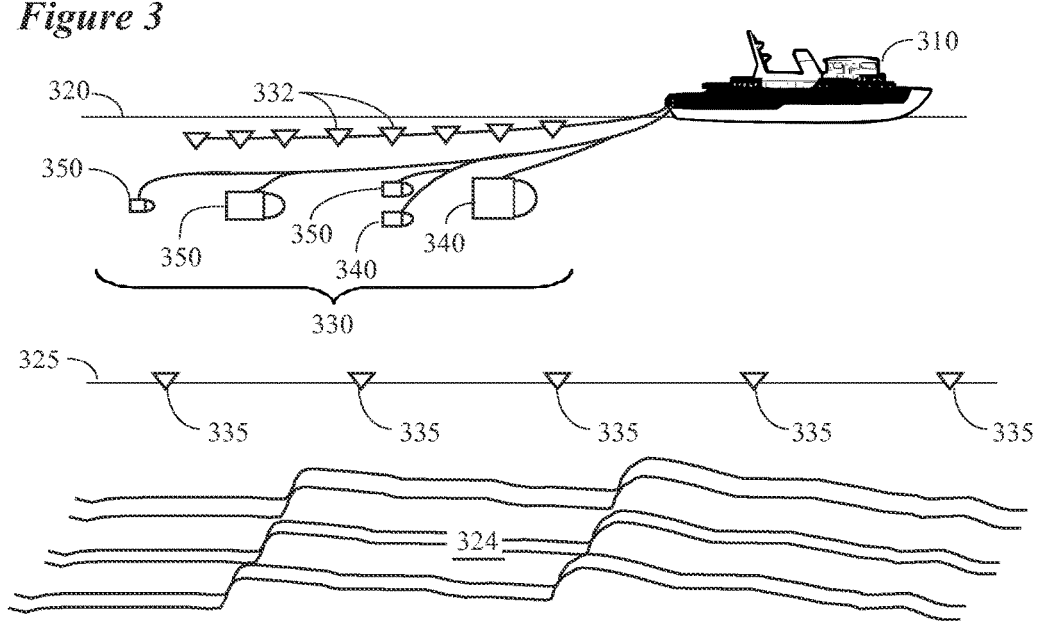
FIG. 3 illustrates an example marine environment.

FIG. 3 contains an illustration of an embodiment as it might be practiced in a marine environment. In an embodiment, one or more seismic vessels 310 will tow some number of receiver sensors 332 in a body of water 320. Additionally, at least one of the vessels 310 will tow a set 330 of seismic sources 340 and 350. Note that the sources 340/350 in the set 330 need not be the same size/capacity/frequency range and could possibly be towed at different depths. On the other hand, the sources 340/350 in the set could all be of the same size/capacity/frequency range and the fact that different sizes of representative icons were used in this figure should not be construed to limit the instant disclosure to only those arrays with sources of different sizes. In some embodiments, additional receivers 335 (e.g., ocean bottom receivers, receivers in well bores for use in a vertical seismic profile, etc.) will be situated on the ocean floor 325. A principal object, of course, is to obtain an image of the subsurface configuration 324.

Continuing with the example of FIG. 3, in this figure each of the individual sources 340 and 350 in the set might get its own randomly generated firing schedule, independent of the others. As another example, the sources of FIG. 3 might be grouped into two subarrays and only two firing schedules would then need to be developed: one for sources 340 and another for sources 350. Those of ordinary skill in the art will readily be able to devise different combinations of sources, subarrays, and firing schedules that would be consistent with the sprit of the instant embodiment.

Figure 4:
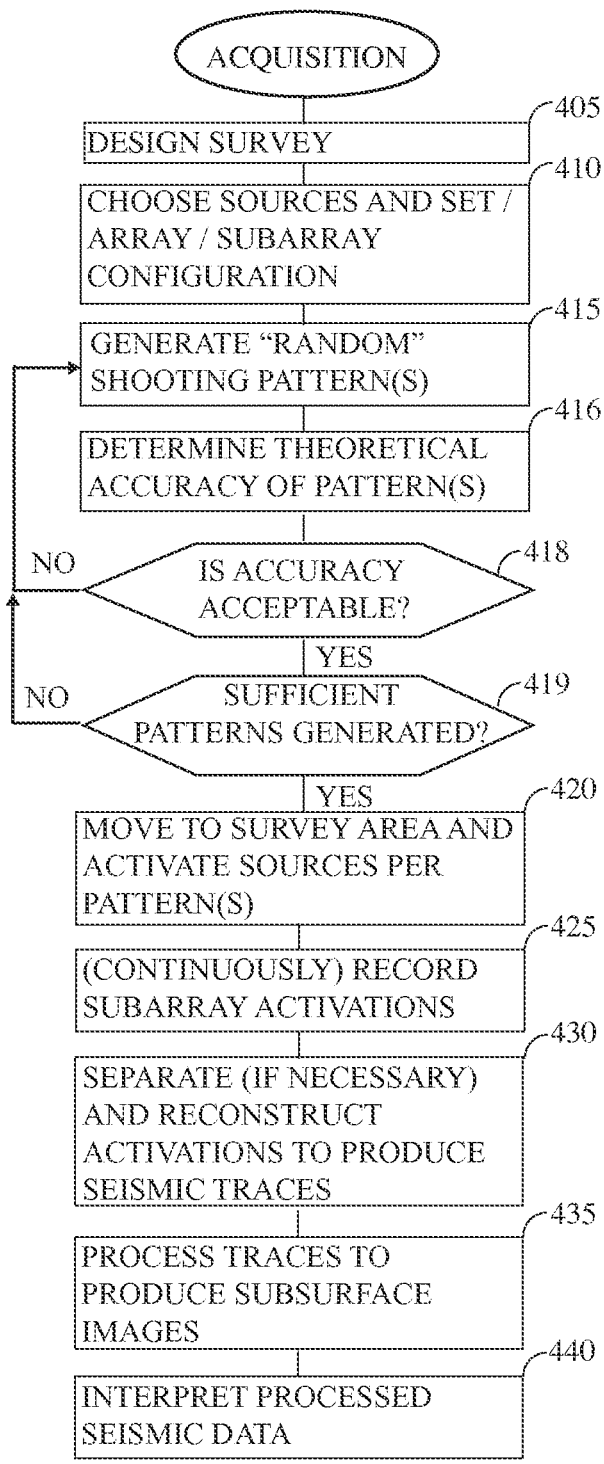
FIG. 4 contains an operating logic suitable for use with an embodiment.

FIG. 4 contains a sample operating logic suitable for use with the instant disclosure. As an initial matter a marine survey will be designed 405. Typically, this will be with the object of imaging a particular subsurface feature or region. In connection with such design, will be the specification of the sources that are to comprise the array that is towed over the survey area (block 410). Additionally, and in some embodiments this will be done during the design of the survey, the sources in the array will be subdivided into two or more subarrays. In some embodiments each subarray will consist of a single source, i.e., there will be as many subarrays as sources. In other instances, one or more sources could be assigned to the same subarray.

Note that the sources might be different sizes and have different frequency characteristics, etc. They might also be towed at the same depth or at different depths. For purposes of the instant disclosure at least two different sources (which might or might not have similar properties) are in the array and that the array be divided into at least two different subarrays. In some instances, multiple arrays will be towed, each potentially having its own shooting pattern which might be independent of (or dependent on, the same as, marginally different from, etc.) the others. Sources that might be appropriate would include some combination of air guns, water guns, sparkers, boomers, chip systems, water sirens, marine vibroseis, non-impulsive marine sources, etc.

Next, a random shooting pattern will be generated (block 415). Note that the word "random" has been placed in quotes as a reminder that, in many cases, the shooting pattern that is generated will not be completely random but will be constrained by some number of parameters that might be related to the depth of the target, characteristics of the towed sources, minimum/maximum acceptable shot spacing, etc. Thus, for purposes of the instant disclosure when the term "randomly generated" is used, it should be understood that schedules of pattern use and timing generated by the inventive method might not be entirely random, but in some embodiments that might be random with constraints. That being said, it is an important aspect of the instant disclosure that at least some degree of randomness must be involved in the creation of at least one of the schedules of pattern use and timing.

In an embodiment, a different firing schedule will be created for each subarray and each such schedule will apply to all of the one or more sources in each subarray. At least two of such schedules must be different, where "different" could mean a single randomly selected firing schedule applied to two different subarrays with one shifted in time relative to the other.

An embodiment of the Monte-Carlo method of generating shooting patterns could start with the number and sizes of the guns available and the length in time of the desired Popcorn pattern. In some embodiments, the length of time over which a Popcorn pattern will be activated might be between about 0.200 seconds and a few seconds (e.g., 5 or 10). In this embodiment, the firing times and order of the guns will be randomly perturbed and a large number of Popcorn patterns generated.

After a shooting pattern has been generated, the theoretical accuracy of the patterns will be determined (block 416). In an embodiment, shooting schedules/patterns generated via this method will be examined after they are generated to identify instances where there are large peaks or broad notches in the spectra of the collected seismic data.

In some instances the accuracy of a Monte Carlo shooting pattern might be evaluated by generating a synthetic seismic survey according to the chosen shooting pattern over a model of the target geology and then determining how well the model was imaged. In other instances, the generated seismic data might be compared with synthetic data that was created using conventional survey design methods. In still other cases, the synthetic data generated according to the instant disclosure might be processed and compared with actual survey data, etc. Finally, the various parameters of the composite seismic source signature could also be tested against limits on maximum peak strength, distinctiveness compared to the other patterns, and the size and location of the notches and peaks in the spectra, etc., in order to establish the acceptability of a candidate pattern.

Another method of choosing from among the Monte Carlo-generated firing schedules would be to choose one that provides the most accurate reconstruction as measured by inversion of the synthetic seismic data. That being said, the computational effort involved in making this computation is substantial would tend to limit the use of this approach.

Additionally, in some embodiments it might be desirable to avoid generating firing schedules that are too similar to each other. Thus, if a new candidate firing schedule is too similar to one that has been selected, in an embodiment it will be generated again.

Finally, criteria such as gun refill time requirements, air supply limits, reuse of guns within a Popcorn pattern, the availability of spare guns, the use of the air guns either to disrupt the water surface to attenuate the ghost notch or to suppress the bubble oscillations of the bubbles still in the water, might also be useful in connection with constraining the randomly generated schedules of pattern use and timing.

Next, in an embodiment a determination will be made as to whether a potential shooting pattern is sufficiently accurate to be used (decision item 418). That is, in some cases a randomly generated shooting pattern might not be the best choice for the local geologic structure, available sources, etc. In instances where that is the case and/or where the randomly candidate schedule does not comply with one or more constraints, another can easily be generated.

If, the model is not imaged sufficiently based on the results of block 416, in some embodiments another shooting pattern will be generated for this subarray (the "NO" branch of decision item 418). On the other hand, if the randomly generated shooting pattern is sufficiently accurate, the "YES" branch of decision item 418 will be taken.

Continuing with this example, a check will be performed to see if each of the subarrays has been provided with a schedule of pattern use and timing (decision item 419) and, if not, additional shooting patterns will be generated for the remaining subarray(s) (the "NO" branch of decision item 419). On the other hand, if a shooting pattern has been designed for each subarray, the survey design process will end (the "YES" branch of decision item 419) the next step would typically be to implement the design it in the field.

Returning now to FIG. 4, next, one or more seismic boats will be dispatched to the survey area and the survey will begin (block 420). In addition to the source boat, additional boats might be present to tow streamers with seismic sensors. For example, it is known to have additional streamer boats if a wide azimuth survey is desired. Additionally, and as is generally indicated in FIG. 3, in some cases ocean bottom receivers (or receivers in well bores, etc.) might be used in conjunction with or instead of marine seismic streamers.

Next, a continuous or intermittent recording will be initiated and each source (or source group) will be activated according to its predetermined schedule (block 425). That being said, continuous recording would generally be favored, although not required.

After acquisition, each seismic data record will contain multiple source activations that will need to be or otherwise processed to cause them to add constructively. That is, each trace can be thought of as being generated by a complex multi-spike source that is activated over some period of time. One method of shaping the resulting composite waveform to approximate a single spike is through an operation such as deconvolution. For purposes of the instant disclosure, the term "reconstruction" should be understood to mean the processing step(s) necessary to convert traces collected during a Popcorn survey into more conventional seismic traces.

In one embodiment the recorded seismic data "d" can be related to the desired unmixed/reconstructed source activations "m" through the following matrix equation:

$$d = Am,$$

where, "A" is a set, a matrix, or a linear operator of Popcorn signatures that are to be applied the signal, where a "Popcorn signature" is the composite signature that is formed when all of the sources in a set are activated according to the specified schedule. In some embodiments, a coherency condition ("C") might also be applied (e.g., the shot at one surface location will tend to resemble the shots at proximate locations, etc.):

$$d = ACm.$$

Since the matrix A is likely to be underdetermined, in some embodiments an iterative approach could be used to obtain d. One method of solving for d would be as follows;

Set m=0;
Set $d_{estimated}=0$
Calculation loop:
$\Delta d = d - d_{estimated}$
$\Delta m = A^{-1} \Delta d$
$m = m + \Delta m$,
apply coherency filter to m
$d_{estimated} = A\,m$ Recalculate $\Delta d$, etc. until the answer is satisfactory. As is indicated above, in an embodiment an FK transform, FX deconvolution, etc., might be used as a coherency filter to attenuate incoherent energy. In some applications, the transform might be applied to a common offset or common receiver gather by taking the FK transform and discarding (e.g., setting to zero) all values below a particular threshold value. Those of ordinary skill in the art will understand that the particular parameter values that control the coherency filter might need to be selected based on experience and/or on a trial and error basis but such is well within the skill of one who practices in this field. The selection of the coherency processing parameters might depend on quality of the recorded seismic data, the Popcorn patterns utilized, the array size, sources used, etc.

Continuous Popcorn allows the shot spacing to be a processing parameter, but continuous Popcorn may also involve a significant element of self-simultaneous shooting and subsequent separation of the overlapping source activations (block 430). That being said, in many embodiments self-simultaneous shooting will not be desired and, in such case, the data will not need to be separated and reconstruction can proceed as is discussed supra.

To ensure that the shots defined by the processing for a given shot spacing can be well separated, the Popcorn patterns used should be designed to work well with several possible shot spacings. While the patterns for each shot spacing are unlikely to be orthogonal, the patterns should avoid strong correlations between the effective patterns used with the various shot spacings that may be attempted during the processing of the data.

Next, the reconstructed and separated (if necessary) seismic traces will be further processed as has been described previously (block 435) to produce subsurface images. In some instances, seismic generated from different subarrays will be combined to reduce noise or for other reasons (block 432).

Finally, the seismic sections, attribute analyses, etc., will be available for use in prospect generation, subsurface interpretation, etc. (block 440).

Figure 7:
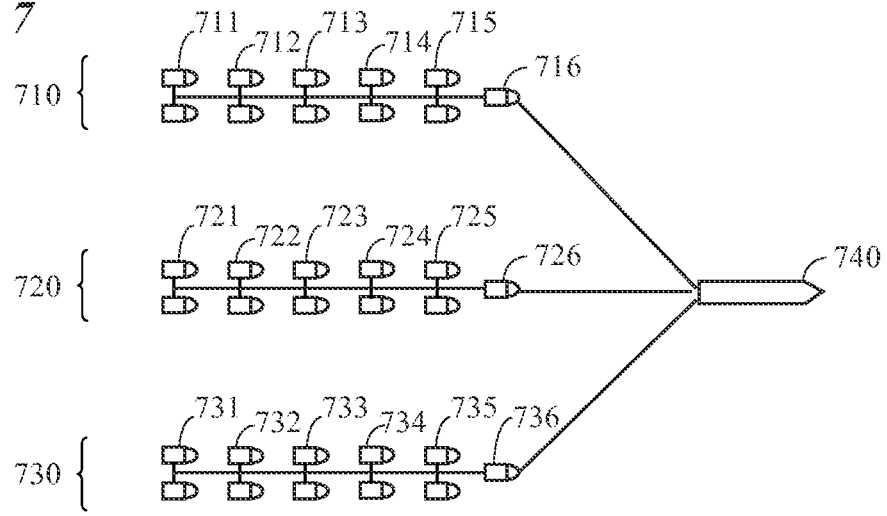
FIG. 7 contains a schematic illustration of an array configuration suitable for use with an embodiment.

FIG. 7 has been provided as a specific example of how the instant disclosure might operate in practice. As is generally indicated in this figure, in this embodiment one or more vessels 740 will tow three source arrays 710, 720, and 730, each of which will be comprised of some number of marine sources 711-716, 721-726, and 731-736, respectively, and collectively comprise the set of sources for this example. Those of ordinary skill in the art will recognize that there might be more or fewer source arrays and multiple boats, including a separate boat or boats to tow the receivers.

Note that these sources might be identical or, more typically, different sizes, towed at different depths, etc. In this particular example, each "source" 711-715, 721-725, and, 731-735 is actually a pair of airguns. This is a design consideration that might be changed depending on many different considerations. Although in the description that follows the paired sources may be described as firing together, obviously each could be fired separately if that were desired and such might actually be preferred in some scenarios.

Continuing with the example of FIG. 7, each of the pair of sources 711-716 will be assumed to be airguns with volumes of 140, 100, 120, 40, 100, and 140 cubic inches, respectively; sources 721-726 will be assumed to have volumes of 350, 80, 200, 70, 175 and 80 cubic inches, respectively; and, sources 731-736 will be assumed to have volumes of 250, 100, 120, 100, 40, and 140 cubic inches.

Figure 8:
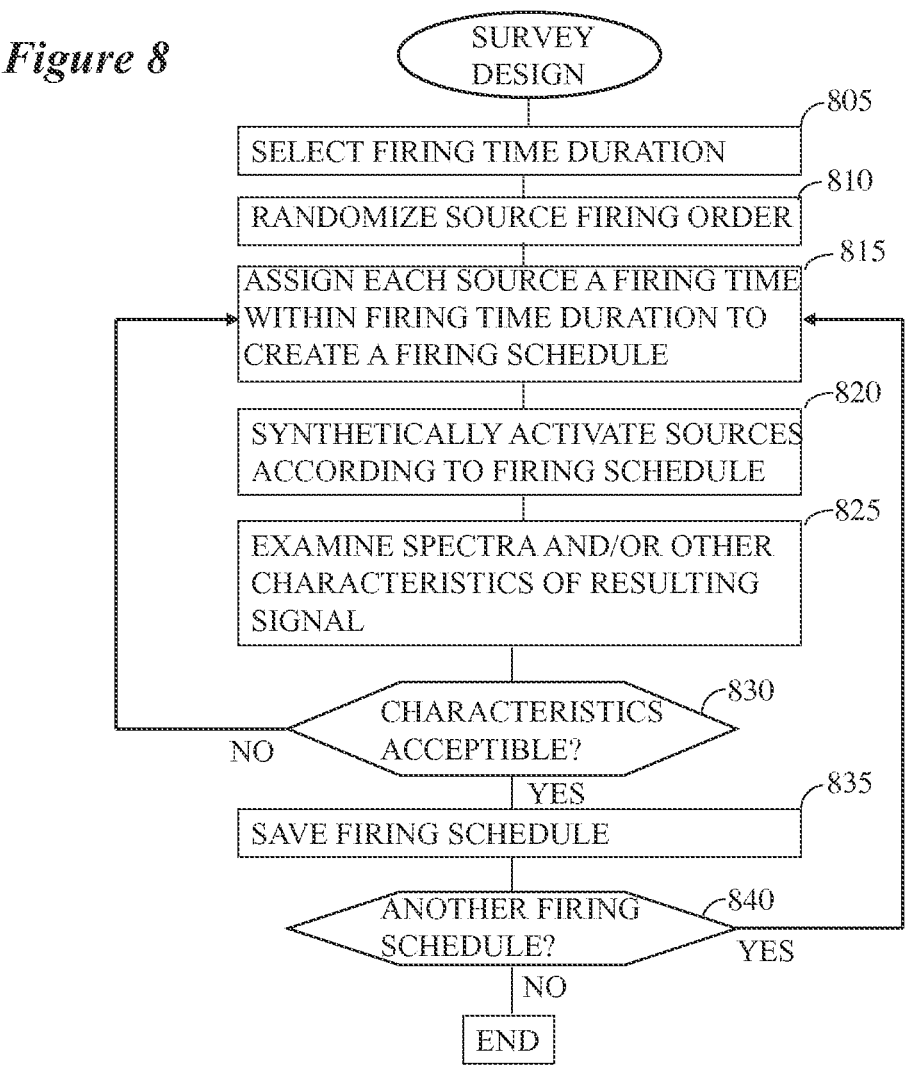
FIG. 8 contains an example of an operating logic suitable for use with the example of FIG. 7.

In this particular example and further according to FIG. 8, as an initial step in the survey design process a firing time duration (T) will be selected (block 805). This is a period of time during which all of sources in the set will be activated in turn. For example, the time period might be 1 second. More generally, time periods between about 0.200 seconds and a few seconds would typically be used. In some embodiments this length of time will be kept relatively short in order to avoid smearing the data due to movement of the towing boat while the sources are activated Next in the embodiment of FIG. 8, each of the sources will be assigned a randomized order in the firing sequence (block 810). For example, the ordering might be that the source pair 734 will be activated first followed by source pairs 716, 723, 711, etc. It should be clear that the same approach could be applied if the sources in each pair were activated separately.

Next, each source will be assigned a random firing time within the firing time duration (block 815). In some embodiments, if there are N sources N random numbers will be generated within the interval between zero and T and placed in ascending order. In some embodiments the random numbers will come from a uniform distribution but obviously other probability distributions could be used instead. This block will define the firing schedule for the array. Continuing with the current example, if T is 1 second then the unordered random time values might be 0.034 sec., 0.410 sec., 0.943 sec., 0.147 sec., etc.

Next, each source will be activated numerically (block 820) according to the firing schedule and the resulting waveforms digitally generated and combined. The composite recording of all source activations can then be examined to determine whether or not it would be suitable for use in the field (block 830). Among the sorts of criteria that might be used include the presence/absence of notches in the resulting spectrum, the maximum amplitude of the composite signal, the amplitude of the low frequencies, the distribution of frequencies generally, how similar the schedules are to each other (e.g., dissimilar may be better), etc. Those of ordinary skill in the art will be able to these and other criteria to determine whether a particular schedule of pattern use and timing is appropriate for use in a particular geologic setting.

Continuing with the present example, if the characteristics are acceptable (the "YES" branch of decision item 830) that schedule of pattern use and timing will be saved (block 835). If not, another firing schedule will be generated (the "NO" branch of decision item 830 and the return to block 815). Of course, in some instances the returning branch could be to block 810, in which case a new ordering would be determined for the source activations.

Finally, a test will be performed to determine whether or not sufficient firing schedules have been accumulated (decision item 840). In some embodiments a single firing schedule will be used throughout the survey. In other instances, though, several acceptable schedules will be identified (e.g., 5 or 10) and the identified schedules systematically alternated (e.g., rotated) or randomly chosen each time a new shot point is approached. In some embodiments, it may be necessary to test 1000 or more firing schedules in order to find some number that are acceptable.

According to still another embodiment, there is provided a method of planning and conducting a seismic survey wherein the chosen patterns and shot times for the entire survey will be optimized. That is, in some embodiments there will be a number of possible shot times and patterns which might potentially be acceptable. One approach to doing this would be to assemble a matrix that contains the various weak and/or attenuated parts of the spectra from the gun times along with the order of the patterns used along the line. The goal then would be to choose the patterns and times that maximize the frequency content (e.g., maximize the minimum frequency) in the resulting spectra. Another approach would be to create synthetic seismic data based on the proposed survey design and choose the survey design that best images the subsurface.

This embodiment might be used in conjunction with the Monte Carlo methods discussed previously to help insure that a randomized approach does not inadvertently produce a combination of shots, times, or patterns that result in a survey that does not image the subsurface adequately. As is well known randomization can produce by chance, among others, arbitrarily long streams of identical numbers. In the context of the present invention, that means that a truly randomized survey might be selected which utilizes the same patterns/timings throughout. However, in this embodiment as a final check, the randomly selected schedule might be analyzed and/or optimized as is indicated above.

Needless to say such an approach might require substantial amounts of computer power. However, given that the same optimized design might be reused in the same region multiple times (e.g., when in-field production monitoring is used) the resource expenditure may be worthwhile in some cases.

In practice, the resulting survey design will be taken to the field and implemented over a subsurface target of interest to obtain a seismic survey that includes or images the target. In some instances, a schedule of pattern use and timing will be activated every 10 seconds or so, however selection of that time interval will likely need to be determined on a case by case basis and could include, among other considerations, how frequently each of the airguns can be refilled and discharged. As was noted previously, in some instances a different schedule of pattern use and timing will be utilized at each shot point, with the schedule of pattern use and timing being systematically or randomly chosen from among multiple acceptable schedules.

Of course, although some embodiments are based on pre-selection of the schedule of pattern use and timing in advance of moving into the field, it should be understood that such could alternatively be done in field. If the computer power were available, the schedules of pattern use and timing could be determined at each shot point by using, for example, automated criteria of the sort disclosed herein to screen for relatively good schedules.

Note that the foregoing is just one of many ways the instant teachings could be implemented. In other embodiments, each subarray might be given an independently generated firing schedule that might (or might not) utilize equal spacing between successive shots of the same subarray. Although that might be preferable in some instances, in most cases an approach wherein all of the subarrays are fired within a short period of time would be preferred.

In the foregoing, much of the discussion has been discussed in terms of marine seismic surveys, but that was done for purposes of illustration only and not out of an intent to limit the application of the instant system and method to only those sorts of surveys. Those of ordinary skill in the art will understand how the embodiments presented supra could readily be applied to, by way of example, 2D, 3D, 4D, etc., marine surveys, land surveys, down hole surveys, VSP surveys, cross well surveys (using a set of down hole sources), etc.

Figure 9:
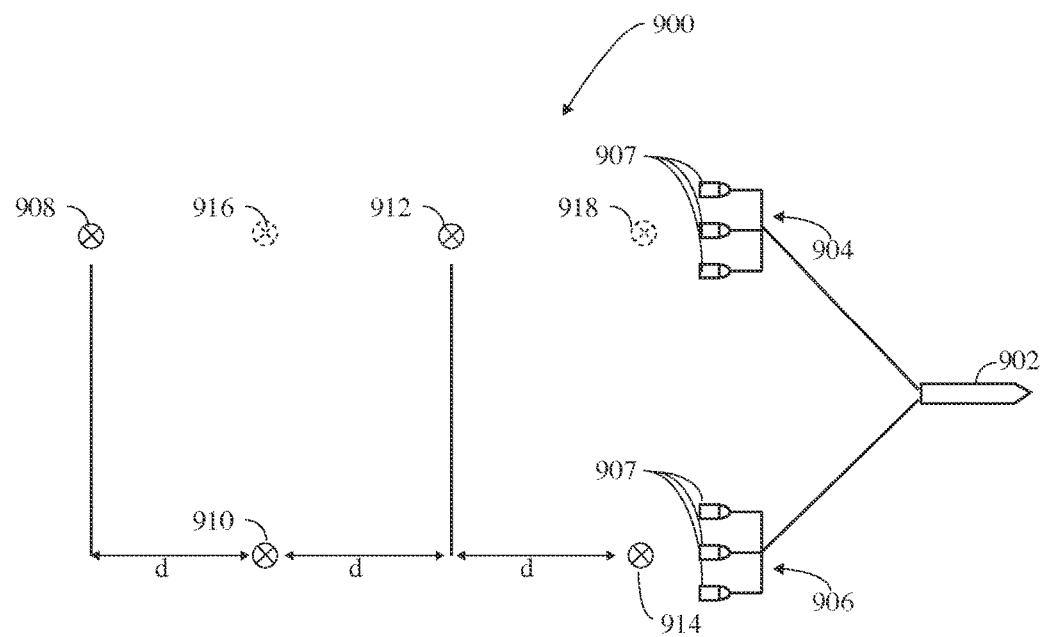
FIG. 9 contains a schematic illustration of an array configuration suitable for use with an embodiment.

FIG. 9 is a schematic illustration of an embodiment of a seismic exploration apparatus 900. In the embodiment, one or more vessels 902 will tow two source arrays 904, and 906, each of which will be comprised of some number of marine sources 907 and collectively comprise the set of sources for this example. Those of ordinary skill in the art will recognize that there might be more or fewer source arrays and multiple boats, including a separate boat or boats to tow the receivers.

Note that these sources 907 might be identical and towed at the same depth or, more typically, different sizes, towed at different depths, etc. In one example, each "source", is a plurality of airguns. This is a design consideration that might be changed depending on many different considerations. Although in the description that follows the sources may be described as firing together, obviously each could be fired separately if that were desired and such might actually be preferred in some scenarios.

As described above, the depicted configuration provides self-simultaneous sourcing by shooting at positions 908, 910, 912 and 914, since the closely spaced source activations cause the signals from each shot to interfere with one another. Further, the shots are executed as the vessel 902 travels through the water, where the self-simultaneous shots are spaced apart by a distance "d" which may be determined based on various factors to provide the desired level of interference between shots. In embodiments, the vessel 902 velocity varies due to wind, waves etc. In such cases, spacing apart the shots by the distance "d" is helpful in providing self-simultaneous sources. Accordingly, in an embodiment, adjacent shots in the sequence, such as shots 908 and 910, may materially interfere with one another during self-simultaneous shooting depending on "d" and the speed of the vessel 902.

Note that in one embodiment, self-simultaneous sourcing may be obtained by activating the single source 904 (without activating the other source 906) at positions 908, 916, 912 and 918, again assuming that the distance "d" spacing between shot points causes interfering reflections. In another embodiment of self-simultaneous sourcing, three arrays, such as arrays 904, 906 and an additional array (not pictured), may alternate shooting at a selected distance apart while being towed by the same vessel.

In some embodiments, while typical times between adjacent shots may have sufficient randomness due to variations in the vessel speed due to wind, waves, and other causes, to insure randomness in the shot times, an additional random time (e.g., a dither or small perturbation) may be imposed on each shot to help insure that the interference between shots is incoherent. This may be implemented by added a small random time value (e.g., plus or minus 250 ms multiplied by a [0,1] uniform random variable) to each shot. It may also be implemented by monitoring the times between shots fired at the distance interval "d" and varying the shot position and/or firing time slightly if an unexpected regularity in the time between shots occurs.

It should also be noted and remembered that the embodiments presented herein are only given as examples and the teachings should not be limited to these examples unless specifically so indicated.

Further, although the text might have described the seismic sources as "guns", "airguns", etc., that was done only for purpose of illustration and any marine source including, without limitation, air guns, water guns, sparkers, boomers, chirp systems, water sirens, etc., might potentially be used. Additionally, as noted previously the instant disclosure could be applied on land as well. Further, instances where the term "shot" was used herein should not be construed to limit the instant disclosure to only operating with impulsive sources. Thus, when the term "seismic survey" is used herein that term should be understood to apply to a survey on water, land, or any combination of same.

Still further, where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Additional details related to the simultaneous source and self-simultaneous source methods may be found in one or more of the following references, the disclosures of which are incorporated herein by reference in their entirety and for all purposes as if fully set out at this point: U.S. patent application Ser. No. 12/542,433; Method For Separating Independent Simultaneous Sources/USSN), U.S. Patent Application Ser. No. 61/154,613; Separation Of Simultaneous Seismic Sources By Non-Linear Inversion/Abandoned USSN), and U.S. patent application Ser. No. 13/315,925; Distance-And Frequency-Separated Swept-Frequency Seismic Sources).

Further, when in this document a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

Additionally, while this disclosure is susceptible of embodiment in many different forms, there is shown in the drawings, and will herein be described hereinafter in detail, some specific embodiments. It should be understood, however, that the present disclosure is to be considered an exemplification of the principles of the system and method taught herein and is not intended to limit it to the specific embodiments or algorithms so described.

While the disclosed system and method has been described and illustrated herein by reference to certain embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration for hydrocarbons within a region of the subsurface of the earth via a set of seismic sources arranged as a plurality of subarrays, each of said subarrays having one or more seismic sources of the set of seismic sources associated therewith, the method comprising:
   (a) determining a firing time duration;
   (b) randomly assigning each seismic source of the set of seismic sources a different firing time within said firing time duration as a Popcorn pattern, determining whether the Popcorn pattern meets or exceeds a criterion based upon distinctiveness of the Popcorn pattern, wherein the distinctiveness of the Popcorn pattern is determined as a measure of firing time separation of seismic sources of the set of seismic sources, and forming a firing schedule comprising the Popcorn pattern when the Popcorn pattern meets or exceeds the criterion;
   (c) positioning said set of seismic sources at a first location proximate to the region of the subsurface of the earth;
   (d) activating each seismic source of the set of seismic sources according to said firing schedule;
   (e) recording seismic data as each seismic source of the set of seismic sources is activated;
   (f) performing steps (d) and (e) at a plurality of different locations proximate to the region of the subsurface of the earth, thereby acquiring a Popcorn seismic survey;
   (g) reconstructing said recorded seismic data from said Popcorn seismic survey, thereby obtaining a plurality of seismic traces; and,
   (h) using said plurality of seismic traces to image at least a portion of the subsurface of the earth.

2. The method of claim 1, wherein at least one of said subarrays comprises a single one of said set of seismic sources.

3. The method of claim 1, wherein at least steps (c) through (f) are performed a plurality of times at a plurality of different locations proximate to the region of the subsurface of the earth, thereby acquiring a seismic survey proximate to the region of the subsurface of the earth.

4. The method of claim 1, wherein said firing time duration is less than one second.

5. The method of claim 1, wherein step (g) is performed by solving: d=Am, where m is said plurality of seismic traces obtained by reconstruction, d is said recorded seismic data, and A, is a set of Popcorn signatures corresponding to said firing schedule.

6. The method of claim 1, wherein step (g) is performed by solving: d=ACm, where m is said plurality of seismic traces obtained by reconstruction, d is said recorded seismic data, A, is a set of Popcorn signatures corresponding to said firing schedule, and C is a matrix of coherency conditions.

7. The method of claim 1, wherein the distinctiveness of the Popcorn pattern is determined as a measure of correlation between the Popcorn pattern and a second Popcorn pattern.

8. The method of claim 1, comprising utilizing a Monte Carlo method to generate the Popcorn pattern.

9. The method of claim 1, comprising determining whether the Popcorn pattern meets or exceeds a second criterion based upon a maximum amplitude of a composite signal of the Popcorn pattern and forming a firing schedule comprising the Popcorn pattern when the Popcorn pattern meets or exceeds the second criterion.

10. A method of seismic exploration for hydrocarbons within a region of the subsurface of the earth, the method comprising:
    (a) accessing a plurality of seismic traces within a seismic survey collected proximate to the region of the subsurface of the earth according to an acquisition method comprising:
       (1) selecting a set of seismic sources, said set of seismic sources comprising a plurality of subarrays, each of said subarrays comprising one or more of said set of seismic sources,
       (2) determining a firing time duration,
       (3) randomly assigning each of said plurality of subarrays a different firing time within said firing time duration such that each seismic source of the set of seismic sources is assigned a particular firing time within said firing time duration as a Popcorn pattern, determining whether the Popcorn pattern meets or exceeds a criterion based upon distinctiveness of the Popcorn pattern, wherein the distinctiveness of the Popcorn pattern is determined as a measure of firing time separation of seismic sources of the set of seismic sources, and forming a firing schedule comprising the Popcorn pattern when the Popcorn pattern meets or exceeds the criterion;
       (4) positioning said set of seismic source at a first location proximate to the region of the subsurface of the earth,
       (5) activating each seismic source of the set of seismic sources according to its assigned firing time within said firing time duration,
       (6) recording seismic data as each seismic source of the set of seismic sources is activated,
       (7) performing at least steps (4) through (6) a plurality of times at a plurality of different locations proximate to the region of the subsurface of the earth; and
       (8) reconstructing said recorded seismic data to obtain said plurality of seismic traces; and,
    (b) using said plurality of seismic traces to image at least a portion of the subsurface of the earth, thereby exploring for hydrocarbons within the region of the subsurface of the earth.

11. The method of claim 10, wherein at least one of said plurality of subarrays comprises a single one of said set of seismic sources.

12. The method of claim 10, wherein said firing time duration is less than one second.

13. The method of claim 10, wherein step (8) is performed by solving: d=Am, where m is said plurality of seismic traces obtained by reconstruction, d is said recorded seismic data, and A, is a set of Popcorn signatures corresponding to said firing schedule.

14. The method of claim 10, wherein step (8) is performed by solving: d=ACm, where m is said plurality of seismic traces obtained by reconstruction, d is said recorded seismic data, A, is a set of Popcorn signatures corresponding to said firing schedule, and C is a matrix of coherency conditions.

15. A method of seismic exploration above a region of the subsurface of the earth containing structural or stratigraphic features conducive to the presence, migration, or accumulation of hydrocarbons utilizing a marine seismic array towed proximate to the region of the subsurface of the earth, said marine seismic array comprising a plurality of subarrays, each of said subarrays having one or more marine seismic sources associated therewith, of the method comprising:

(a) generating a plurality Popcorn patterns each determined to meet or exceed a criterion based upon its respective distinctiveness and providing at least one respective Popcorn pattern of the plurality of Popcorn patterns as a different randomly generated schedule of pattern use and timing for each of said plurality of subarrays, wherein the distinctiveness of each Popcorn pattern of the plurality of Popcorn patterns is determined as a measure of firing time separation of the one or more marine seismic sources for each of said plurality of subarrays;

(b) recording seismic data as each of said plurality of subarrays is activated according to said provided schedule of pattern use and timing;

(c) reconstructing said continuously recorded seismic data into a plurality of seismic traces; and, (d) using said plurality of seismic traces to image at least a portion of the subsurface of the earth.

16. The method of claim 15, wherein at least one of said plurality of subarrays comprises a single one of said set of seismic sources.

17. The method of claim 15, wherein duration of activation of each of said plurality of subarrays is less than one second.

18. The method of claim 15, wherein step (c) is performed by solving: $d=Am$, where m is said plurality of seismic traces obtained by reconstruction, d is said recorded seismic data, and A, is a set of Popcorn signatures corresponding to a firing schedule comprising randomly generated schedules of pattern use and timing for the plurality of subarrays.

19. The method of claim 15, wherein step (c) is performed by solving: $d=ACm$, where m is said plurality of seismic traces obtained by reconstruction, d is said recorded seismic data, A, is a set of Popcorn signatures corresponding to said firing schedule, and C is a matrix of coherency conditions.

* * * * *